(12) United States Patent
Polderman

(10) Patent No.: US 8,858,686 B2
(45) Date of Patent: Oct. 14, 2014

(54) METHOD OF REMOVING LIQUID CONTAMINANT DROPLETS FROM A GAS STREAM, AND WASH TRAY

(76) Inventor: Hugo Gerardus Polderman, Amsterdam (NL)

( * ) Notice: Subject to any disclaimer, the term of this patent is extended or adjusted under 35 U.S.C. 154(b) by 921 days.

(21) Appl. No.: 12/667,728

(22) PCT Filed: Jul. 2, 2008

(86) PCT No.: PCT/EP2008/058523
§ 371 (c)(1),
(2), (4) Date: Apr. 29, 2011

(87) PCT Pub. No.: WO2009/004036
PCT Pub. Date: Jan. 8, 2009

(65) Prior Publication Data
US 2012/0103193 A1    May 3, 2012

(30) Foreign Application Priority Data
Jul. 5, 2007 (EP) .................................... 07111792

(51) Int. Cl.
| | |
|---|---|
| *B01D 47/16* | (2006.01) |
| *B01D 47/06* | (2006.01) |
| *B01D 3/20* | (2006.01) |
| *B01D 47/12* | (2006.01) |
| *B01D 53/18* | (2006.01) |

(52) U.S. Cl.
CPC *B01D 47/06* (2013.01); *B01D 3/20* (2013.01); *B01D 47/12* (2013.01); *B01D 53/185* (2013.01)
USPC .................................. 95/219; 96/307; 96/311

(58) Field of Classification Search
CPC ........ B01D 3/20; B01D 53/185; B01D 47/12; B01D 47/06
USPC .................. 95/219; 96/267, 272; 55/236, 237
See application file for complete search history.

(56) References Cited

U.S. PATENT DOCUMENTS

| | | | | |
|---|---|---|---|---|
| 3,254,497 A | * | 6/1966 | Henry et al. ..................... | 62/633 |
| 3,630,666 A | * | 12/1971 | Kunkel ......................... | 423/226 |
| 4,349,360 A | * | 9/1982 | Schuurmans et al. .......... | 96/311 |
| 4,692,179 A | * | 9/1987 | Mehra ............................ | 62/632 |

(Continued)

FOREIGN PATENT DOCUMENTS

| | | | | |
|---|---|---|---|---|
| EA | 195464 | 9/1986 | ............ | B01D 45/16 |
| EP | 48508 | 3/1982 | ............ | B01D 45/12 |

(Continued)

OTHER PUBLICATIONS

H.K. Abdel-Aal, M.A. Fahim, and Mohamed Aggour, Chapter 5 Emulsion Treatment and Dehydration of Crude Oil; Petroleum and Gas Field Processing, 2003, CRC Press, Illustrated Edition, pp. 1-37.*

(Continued)

*Primary Examiner* — Duane Smith
*Assistant Examiner* — Cabrena Holecek
(74) *Attorney, Agent, or Firm* — Charles W. Stewart

(57) ABSTRACT

A method of removing liquid contaminant droplets from a gas stream, comprising providing a wash tray in a vessel with at least one swirl tube device; admitting the gas stream including liquid contaminant droplets into the at least one swirl tube; admitting wash liquid into the gas stream in the at least one swirl tube, to form a gas/liquid mixture with wash liquid droplets dispersed in the gas stream; allowing the wash liquid droplets and liquid contaminant droplets to interact in a scrubbing section; passing the gas/liquid mixture along a swirl imparting means so as to perform centrifugal separation into washed gas and liquid, and removing washed gas and liquid. Moreover a swirl tube wash tray for use in a vessel for removing liquid contaminant droplets from a gas stream by means of a wash liquid, which wash tray comprises having a wash liquid supply means with an outlet opening some distance above a liquid supply space.

13 Claims, 4 Drawing Sheets

(56) References Cited

U.S. PATENT DOCUMENTS

| | | | | |
|---|---|---|---|---|
| 5,298,228 | A | | 3/1994 | Palomares et al. ............ 423/210 |
| 5,683,629 | A | * | 11/1997 | Konijn ......................... 261/79.2 |
| 2004/0200353 | A1 | * | 10/2004 | Bras et al. ....................... 95/211 |

FOREIGN PATENT DOCUMENTS

| | | | |
|---|---|---|---|
| EP | 83811 | 7/1983 | ............. B01D 45/12 |
| EP | 195464 | 9/1986 | ............. B01D 45/16 |
| EP | 562689 | 9/1993 | ............... B01D 3/20 |
| EP | 828543 | 3/1998 | ............... B01D 3/26 |
| JP | 2004256697 A * | 9/2004 | ............... C10K 1/10 |
| WO | WO9638213 | 12/1996 | ............... B01D 3/26 |
| WO | WO2004073836 | 9/2004 | ............. B01D 45/16 |

OTHER PUBLICATIONS

Machine translation of JP 2004/256697.*
Norsok, "Process Systems Standards", P-100, 2001, Rev. 2.*
Lawson et al., Hydrocarbon Removal from Amines Demonstrated Experience, Mar. 16, 2005.*
Headwaters Initiative & Carrier Sekani Tribal Council, Fact Sheet: a Brief on Condensate and Diluents.*
Headwaters Initiative & Carrier Sekani Tribal Council, Fact Sheet:: a Brief on Condensate and Diluents, May 31, 2007, http://boldnebraska.org/uploaded/pdf/HeadwatersInitiative-CondensateFactSheet.pdf.*
Google Date for "Fact Sheet: a Brief on Condensate and Diluents"; http://boldnebraska.org/uploaded/pdf/HeadwatersInitiative-CondensateFactSheet.pdf, accessed Aug. 18, 2014.*
Calvert, S., "Venturi and Other Atomising Scrubbers Efficiency and Pressure Drop," AIChE Journal, vol. 16 (1970), pp. 392-396.
C.R. Pauley, C.R., et al, "Texas Plant Solves Foam Problems With Modified ME System", Oil & Gas Journal, (Feb. 1988), pp. 67-70.
Perry, E. R., et al, Chemical Engineers Handbook, 5th Ed. pp. 20-94 through 20-103.

* cited by examiner

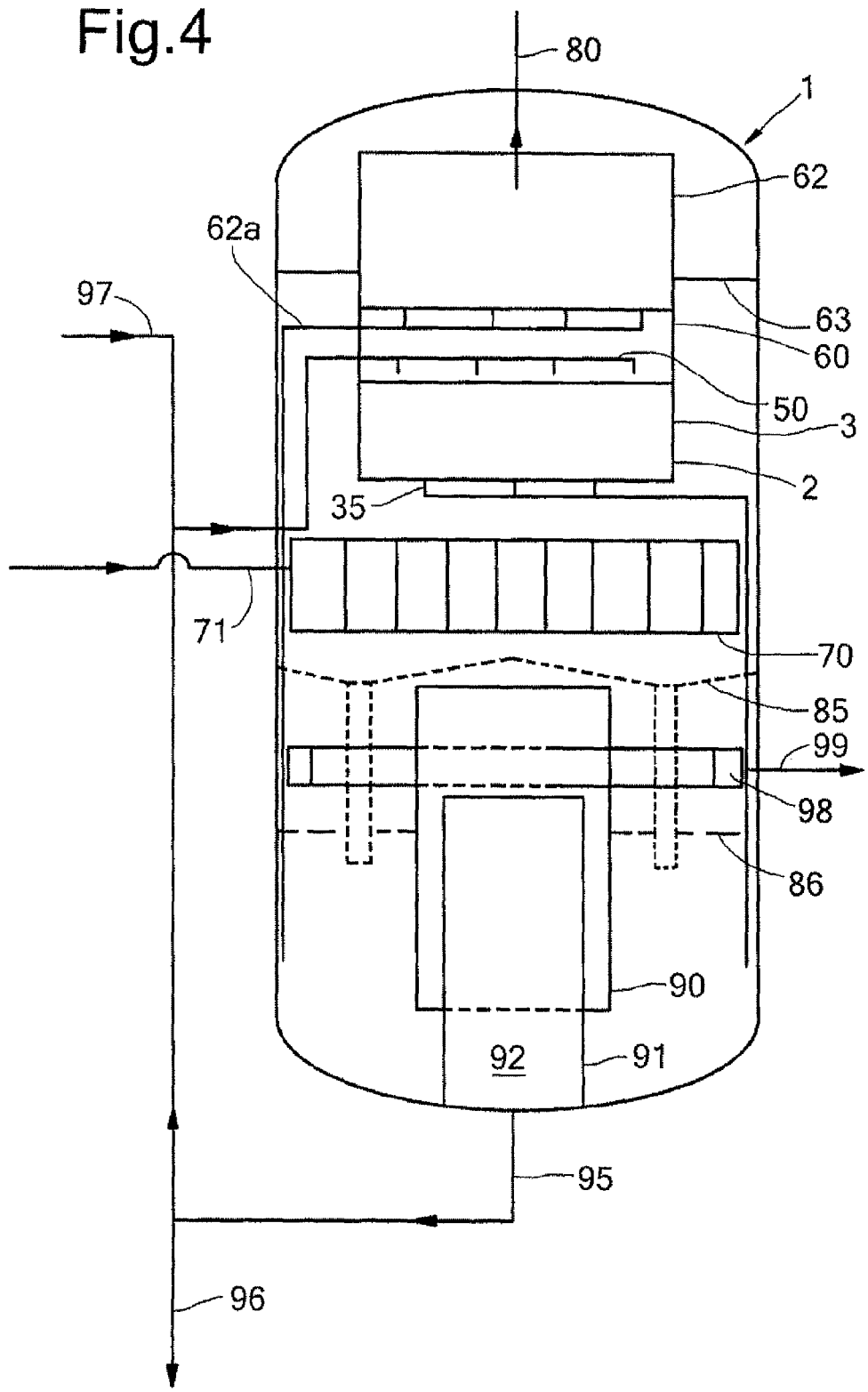

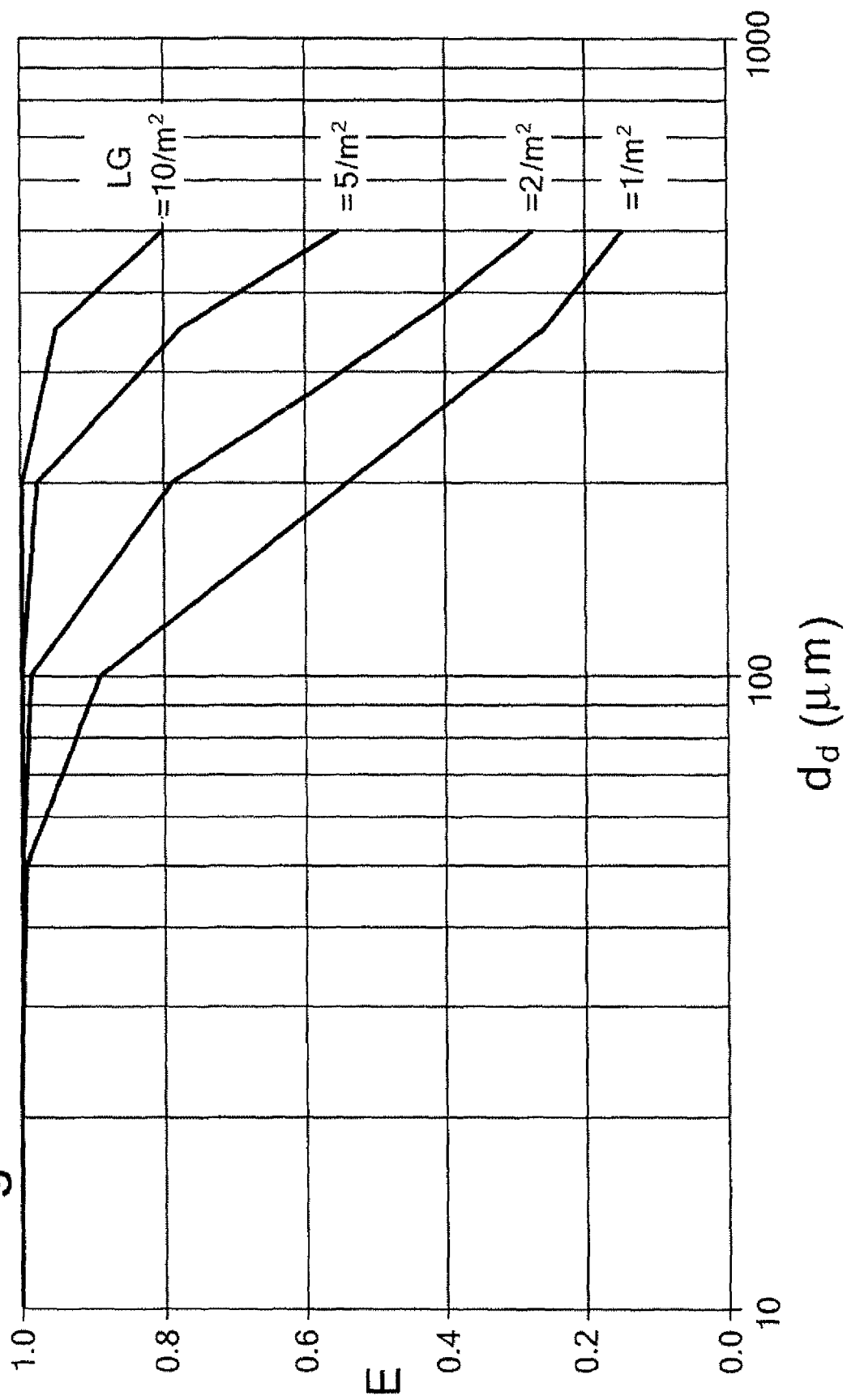

METHOD OF REMOVING LIQUID CONTAMINANT DROPLETS FROM A GAS STREAM, AND WASH TRAY

PRIORITY CLAIM

The present application claims priority of European Patent Application No. 07111792.3 filed 5 Jul. 2007.

FIELD OF THE INVENTION

The present invention relates to a method of removing liquid contaminant droplets from a gas stream, and to a wash tray that is suitable for carrying out this method.

BACKGROUND OF THE INVENTION

Gas treating processes can be very sensitive to contamination by liquid hydrocarbons in the feed gas. An example is amine treatment, such as the Shell Sulfinol process, in which acid gas compounds are removed from a gas stream, in particular a natural gas, by means of an absorption/regeneration cycle. Liquid hydrocarbons increase the foaming tendency in the absorbers, as is known for example from the paper "Texas plant solves foam problems with modified MEA system", C. R. Pauley, B. A. Perlmutter, Oil & Gas Journal, February 1988, p. 67-70. Foaming leads to insufficient acid gas removal capacity and hence reduced gas throughput. Liquid hydrocarbon quantities as small as 50 ppmv can already have a devastating effect on treating plant performance.

These hydrocarbon contaminants moreover are typically present in small droplets, with diameters in the order of microns and below. Due to their small droplet size and low concentration the liquid contaminants are difficult to remove. Using conventional coalescers, such as a wiremesh, is insufficient to coalesce the majority of the liquid contaminants to a larger droplet size that can be removed by e.g. a centrifugal liquid separator, such as a swirldeck, in an inlet separator to the gas treating plant. So, even high-efficiency separators have difficulties in removing small droplets. One option for removal is to use filter systems, but for sufficient efficiency they need to be very large, they cause a large pressure drop, and are difficult to operate in view of regular exchange of filters and associated safety risks. Fibre bed filters moreover generate a large amount of solid waste It is an object of the present invention to provide an improved method and device for removing liquid contaminant droplets from a gas stream.

SUMMARY OF THE INVENTION

To this end there is provided a method of removing liquid contaminant droplets from a gas stream, which method comprises
  providing a wash tray in a vessel, which wash tray comprises at least one swirl tube device, the at least one swirl tube device having an inlet for gas, an inlet for a wash liquid, a scrubbing section, a swirl imparting means downstream from the scrubbing section, an outlet for washed gas, and an outlet for liquid;
  admitting the gas stream including liquid contaminant droplets into the at least one swirl tube via the inlet for gas of the at least one swirl tube;
  admitting wash liquid into the gas stream in the at least one swirl tube via the inlet for wash liquid, to form a gas/liquid mixture with wash liquid droplets dispersed in the gas stream;
  allowing the wash liquid droplets and liquid contaminant droplets to interact in the scrubbing section;
  passing the gas/liquid mixture along the swirl imparting means so as to perform centrifugal separation of the gas/liquid mixture into washed gas and liquid, and
  removing washed gas and liquid from the outlet for washed gas and the outlet for liquid.

The invention is based on the insight that liquid contaminants can be efficiently removed by means of a wash tray including swirl tubes. Swirl tube trays are commonly used for separation of medium to large liquid droplets (>ca. 20 μm) from a gas stream. For example, European patent application publication No. EP 195464 discloses a high-efficiency separator which is an improvement of a centrifugal liquid separator known from European patent application publication No. EP 048508. A coalescer in the form of a mistmat, vanepack, or structured packing, is arranged upstream of the centrifugal liquid separator. It is recognized in EP 195484 that centrifugal liquid separators including swirl tubes have difficulties separating liquid that is present in finely dispersed form. To this end the coalescer first agglomerates liquid drops which can than be separated by the centrifugal liquid separator including swirl tubes. It appears, however, that in practice a mistmat coalescer insufficiently coalesces the fine contaminant droplets.

In the present invention, a wash liquid is introduced into an upstream part of the swirl tube in dispersed form. In the scrubbing section the small liquid contaminant droplets, which normally flow along with the gas, can be captured by interaction with the dispersed wash liquid. The wash liquid drops are large enough to be removed by subsequent centrifugal separation efficiently.

It is noted that European patent specification No. EP 828 543 B1 discloses the use of a horizontal tray including swirl tubes for removing water vapour from natural gas, by counter-currently contacting the natural gas including water vapour, and glycol. Glycol is a solvent for water vapour, and the removal of contaminant droplets from natural gas is not disclosed.

The amount of wash liquid that is added to the gas stream typically is in large excess of the amount of liquid contaminants in the gas. Liquid separated by the swirl tube device therefore predominantly consists of wash liquid, with only a small amount of liquid contaminants therein. At least part of the separated liquid is suitably returned to a wash liquid supply space on the wash tray, which is in fluid communication with the inlet for liquid of the at least one swirl tube. By this recirculation of wash liquid on the wash tray, a beneficial high wash liquid-to-gas ratio can be efficiently established, such as between 5 and 15 l/m$^3$, for example 10 l/m$^3$. Centrifugal separation in swirl tubes can handle such high liquid-to-gas ratios.

In a special embodiment the wash tray comprises a tray plate, on which during normal operation wash liquid is present, and wherein the wash liquid is admitted to the wash tray using a liquid supply means having an outlet for wash liquid above the tray plate. In this way, fresh wash liquid and liquid recycled from the swirl tube device can be efficiently mixed. The tray plate can be an upper tray plate having openings to a liquid supply space below.

An effective wash liquid for treating natural gas streams with liquid hydrocarbon contaminants is water. It appears that it is not a problem to use a wash liquid that does not mix with the contaminant liquid, and it is believed that this is so because the interaction mechanism between contaminant droplets and wash liquid is mechanical/physical. In fact, using a wash liquid that does not mix with the contaminant liquid makes it easier to separate the liquids subsequently, so that wash liquid can easily by re-used. Another option for the wash liquid in natural gas treatment is natural gas condensate, although a larger vessel is required in this case. Glycol is not a suitable wash liquid, due to its high viscosity and tendency to cause foaming.

The invention further provides a wash tray for use in a vessel for removing liquid contaminant droplets from a gas stream by means of a wash liquid, which wash tray comprises a tray plate, a liquid supply space above the tray plate, and a swirl tube device, which swirl tube device comprises a tube having an inlet for gas from below the tray plate and extending in downstream direction to above the tray plate, a means for dispersing liquid droplets in the gas, downstream from the inlet for gas; a swirl imparting means arranged in the tube downstream from the means for dispersing liquid; and guide means for directing liquid from the upper end of the open-ended tube downwardly towards the liquid supply space, the wash tray further comprising a liquid supply means for supplying wash liquid to the tray, wherein the liquid supply means has an outlet opening some distance above the liquid supply space.

BRIEF DESCRIPTION OF THE DRAWINGS

An embodiment of the invention will now be described in more detail and with reference to the accompanying drawings, wherein

FIG. 4 shows schematically a vertical separation vessel including a wash tray of the invention; and FIG. 5 shows graphically the results of calculations of the efficiency E of capturing 1 μm droplets in dependence on collection droplet size $d_d$ and wash liquid/gas ratio L/G.

Where the same reference numerals are used in different Figures, they refer to the same or similar objects.

DETAILED DESCRIPTION OF THE INVENTION

Figure 1:
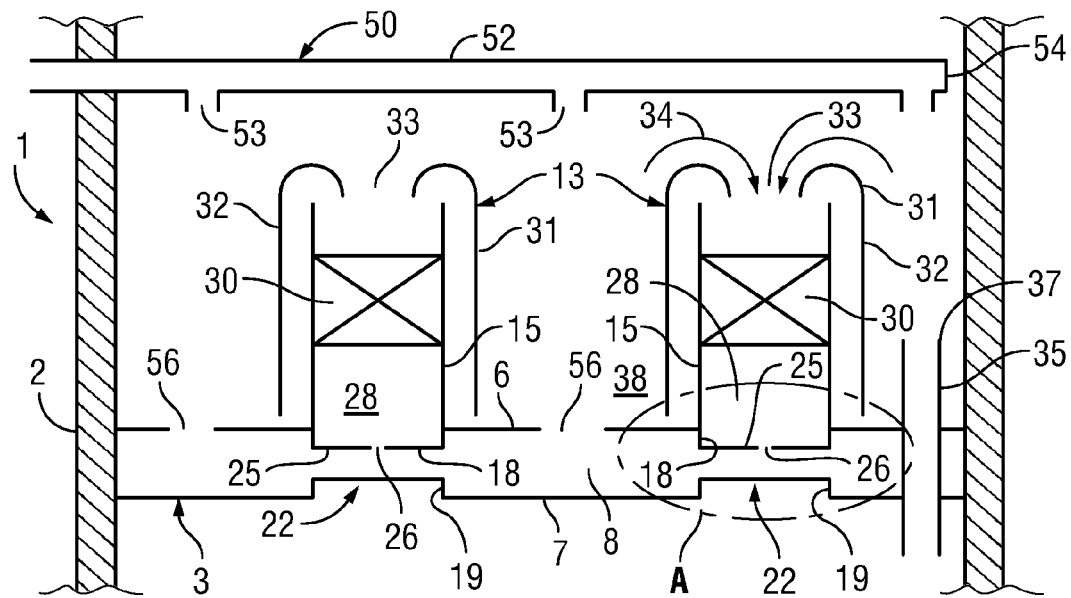
FIG. 1 shows schematically a wash tray according to the invention mounted in a vertical vessel, vertical cross-section.

Reference is made to FIG. 1, showing schematically an embodiment of a swirl tube wash tray according to the present invention, in cross-section. The wash tray is arranged in a vertical vessel or column 1, comprising a housing 2 in which the wash tray 3 is provided. In the embodiment shown, the housing is formed by the vessel wall, in other embodiments the housing can be arranged separately in the vessel.

The wash tray 3 is shown in horizontal orientation suitable for normal operation and comprises an upper horizontal plate 6 and a lower horizontal plate 7. Between the upper and lower horizontal plates 6 and 7 is defined a liquid supply space 8. The wash tray 3 is furthermore provided with a swirl tube device 13. Two of such devices are shown in the drawing for illustration purposes. More or less swirl-tube devices can be arranged. The swirl tube device 13 comprises an open-ended tube 15 extending from above the upper horizontal plate 6 through an opening 18 in the plate 6 to an opening 19 in the lower horizontal plate 7. The tube can also extend through the lower plate 7 so that it has an inlet below the lower plate. The opening 19 is an inlet for gas from below the lower horizontal plate 7. In the drawing, the downstream direction in the open-ended tube 15 is upwards.

The swirl tube device 13 further comprises an inlet for liquid, in the form of liquid delivery device 22. The liquid delivery device 22 comprises an open-ended conduit 25, provided with an upwardly directed liquid delivery opening 26, wherein the open ends of the open-ended conduit 25 open into the liquid supply space 8 so as to be in fluid communication therewith. For the sake of clarity it is remarked that the conduit 25 does not block vertical upward passage of gas from below into the tube 15. The liquid delivery opening 26 in this example is centrally arranged in the open-ended tube 25, and is so arranged that it represents a means for dispersing liquid droplets in the gas flowing during normal operation upwardly through the tube 15, downstream from the gas inlet 19.

The swirl tube device 13 further comprises a scrubbing section 28 in which the gas and the liquid dispersed by the liquid delivery device interact, and a swirl imparting means 30 arranged in the open-ended tube 15 some distance above the liquid delivery device 22. A suitable distance is at least half the diameter of the tube 15 or more, preferably 1 diameter or more, such as 2 diameters or more. Moreover there is provided guide means 31 to direct liquid from the upper end of the open-ended tube 15 onto the upper horizontal plate 6. The guide means 31 include an outer tube 32 having an upper end that inwardly extends over the upper rim of the tube 15. The outer tube 32 extends around the open-ended tube 15, downward to some distance above the upper horizontal plate 6.

A central gas outlet opening 33 allows gas to leave the swirl-tube device upwardly. In the embodiment as shown in the drawing the guide means 31 suitably further includes a beaker-shaped gas outlet arranged in the upper end of the outer tube. To illustrate this embodiment a beaker-shaped gas outlet 34 is shown as part of the guide means 31 pertaining to the rightmost swirl-tube device 13 of the tray 3. It is shown to extend somewhat over the inner rim of the lower guide means, and can thus serve to capture liquid droplets that are re-entrained at the lower rim.

The upper part of the tube 15, downstream from the swirl-imparting means 30, can be provided with openings such as slits in the wall, but can also be closed.

The wash tray 3 further comprises an open-ended down-comer 35 having an inlet 37 arranged above the upper horizontal plate 6 and an outlet arranged below the lower horizontal plate 7. Between the upper plate 6 and the inlet 37 a liquid collection space 38 is formed.

Figure 2:
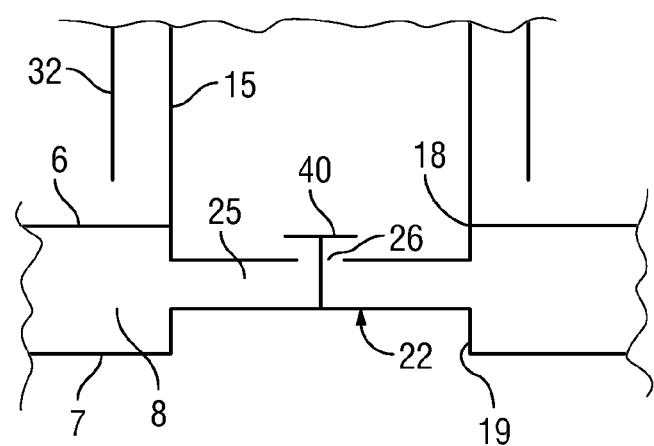
FIG. 2 shows detail A of FIG. 1 enlarged.

FIG. 2, corresponding to section A in FIG. 2, shows a special embodiment of a means for dispersing liquid in the gas stream. In this embodiment, a deflector 40 is arranged directly above the liquid delivery opening 26. Suitably the deflector 40 is a plate which has a diameter up to 0.5 times the internal diameter of the open-ended tube 15, and suitably in the range of from 0.1 to 0.5 times the internal diameter of the open-ended tube 15. In other embodiments the liquid dispersion means can have more than one opening, such as off-axis in the tube 15. More conduits 25, for example extending in parallel across the tube 15, can be arranged. If gas entering the swirl tube devices 13 from below has a swirl component, the conduit(s) 25 also serves as to break this swirl. Instead of the deflector 40 a gauze can be arranged on which a liquid film is formed and from which wash liquid droplets can be entrained by the gas passing along. Generally speaking, the dispersion is suitably provided by generating a liquid film at a location where it can be easily broken off and entrained by the gas flowing along, such as at the sharp rims of the deflector 40. The wash liquid height available is generally insufficient to drive the dispersion via a nozzle or the like.

Returning to FIG. 1, the wash tray further comprises a liquid supply means for supplying wash liquid to the tray in the form of wash liquid header 50. The wash liquid header of this embodiment is a conduit 52 extending horizontally across the diameter of the vessel 1, above the swirl tube devices 13. The conduit 52 is shown here to extend straight through one side of the housing, from which side liquid is supplied, but it will be understood that other pathways for the conduit 52 are possible. The conduit is provided with outlet openings 53. The downstream end 54 is closed.

An inlet for liquid into the liquid supply space 8 from above the upper plate 6 is provided in the form of inlet openings 56. In FIG. 1 it seems as if the outlets 53 from the wash liquid header 50 are arranged directly above the inlet openings 56 and the downcomer inlet 37, suitably however there is an offset in the direction perpendicular to the paper plane so that wash liquid is discharged from the outlets 53 onto the upper tray plate. This will become clear in the top view of the embodiment of FIG. 3.

Figure 3:
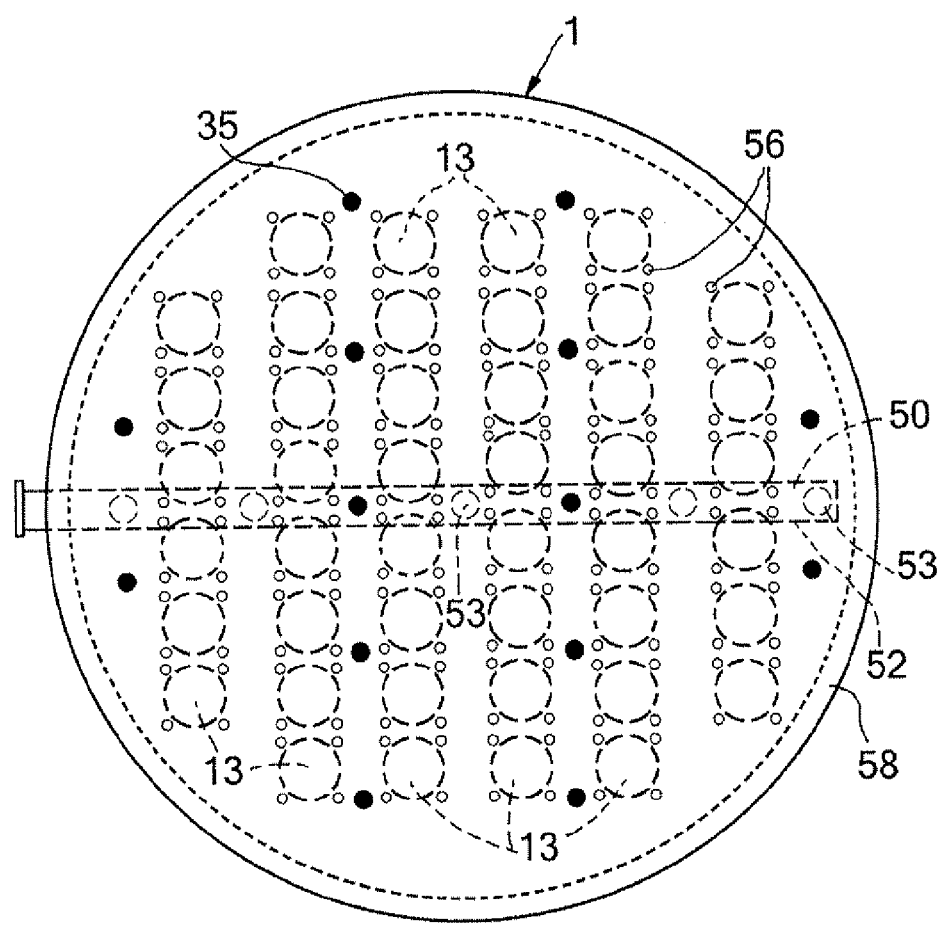
FIG. 3 shows schematically a top view of a wash tray of the invention.

Reference is made to FIG. 3 showing a top view of a wash tray according to the invention. A plurality of swirl tube devices 13 is arranged in a grid pattern. The wash liquid header 50 extends across the diameter of the vessel 1. Four inlet openings 56 per swirl tube are arranged as shown. The downcomers 35 are also indicated. In vertical projection the liquid inlets 56 and downcomers 35 are offset from the outlets 53. The tray shown here is supported on an annular ring 58 fixed to the housing 2 or vertical vessel 1.

In FIG. 4, the swirl-tube wash tray 3 is schematically shown mounted in a vertical vessel 1 together with other internals. The wash tray 3 is mounted in a separate housing 2 in the vessel 1, which housing is suspended via sealed mounting 60 from a separation swirl deck 62, and which separation swirl deck 62 is sealingly mounted in the vessel 1 via support plate 63.

A gas inlet assembly 70 is provided for gas inlet from feed line 71, and for preseparation. The gas inlet assembly that is schematically indicated in FIG. 4 is a so-called vane-type inlet device, such as known for example from Great Britain patent application No. 1 119 699. Such a vane-type inlet device serves for gas inlet, distribution over the cross-section of the vessel, and preseparation of any large liquid drops by centrifugal deflection on the outwardly curved vanes that are stacked one behind the other in the direction of gas flow along the device 70. Other gas inlet devices such as a vapour horn or a deflector plate can also be used.

The separation swirldeck 62 can be of a type disclosed for example in European patent application publication No. EP 083811 or EP 1594589. The separation swirldeck suitably comprises a plurality of centrifugal liquid separators or swirl tubes arranged over the cross-section of the swirl deck. The swirl tubes have an inlet for washed gas at their lower end, an outlet for gas at their upper end, and an outlet for separated liquid. An outlet 80 for dry gas from the swirldeck is arranged at the top of the vessel 1.

The separated liquid is discharged from the swirldeck 62 via a conduit 62a, suitably to the bottom of the vessel, but discharge to the wash tray 3 is also a possibility. In selecting the discharge position it is taken into account that the outlet from the discharge conduit should be sealed in a liquid phase during normal operation.

Underneath the inlet device 70 a collector tray 85 is arranged, to separate the liquid sump that is formed during normal operation in the bottom part of the vessel 1 from the inlet device 70, and to guide liquid separated in the inlet device towards the hydrocarbon/water interface level 86 maintained in the sump.

The bottom part of the vessel 1 is further provided with a double weir system 90,91 to enable separate removal of water and hydrocarbons.

The water outlet line 95 is arranged to receive water from cylindrical water compartment 92, and is in fluid communication with the wash liquid header 50 for supply of wash liquid (water in this case) to the wash tray. Part of the water is discharged from the vessel 1 via bleed line 96, and fresh water is added via make-up line 97.

The liquid hydrocarbons can be skimmed off via an annular hydrocarbon compartment 98 having an outlet 99, into which compartment hydrocarbons can flow via an overflow weir.

In the following normal operation of the vessel 1 will be discussed, illustrating the operation of the wash tray and the method of the invention.

The vessel 1 can serve e.g. as an inlet gas/liquid separator for a gas treating section of a liquid natural gas (LNG) plant. The gas treating section can comprise a downstream acid gas removal unit (AGRU) such as a so-called Sulfinol unit.

Typical operating conditions for the vessel 1 can be described in terms of the flow parameter $\phi$ and the gas load factor $\lambda$. The flow parameter $\phi$ is defined as $\phi = M_L/M_G \cdot \text{sqrt}(\rho_G/\rho_L)$, wherein $M_L$ and $M_G$ are the liquid and gas mass flow rates and $\rho_L$ and $\rho_G$ the liquid and gas densities, respectively. The flow parameter is a suitable measure for liquid load in a vessel. Typical flow parameters at which the present invention will be applied are in the range of less than 0.05, such as between 0.001 and 0.05.

The gas load can suitably be characterized by the gas load factor $\lambda$, which is defined as: $\lambda = Q/A \cdot \text{sqrt}(\rho_G/(\rho_L - \rho_G))$, wherein Q is the volumetric gas flow ($m^3$/hr), A is the available cross sectional area ($m^2$) for gas flow in the vessel. The factor under the square root accounts for the effect of pressure. The ratio Q/A is also referred to as superficial gas velocity. Typical gas load factors at which the present invention will be operated during normal operation are in the range $\lambda = 0.1-0.25$, in particular $\lambda = 0.12 \ldots 0.20$.

The vessel 1 can for example have a diameter of 1.5 m. A typical gas throughput is in the order of $1 \ldots 10 \cdot 10^{\wedge}6 \, Sm^3$/day (standard cubic meters per day). A typical liquid content of the feed received via line 71 is 100-1000 l/h.

A wiremesh coalescer is not sufficiently effective for coalescing small liquid droplets of e.g. 20 μm diameter and below. The gas stream can contain liquid contaminants with a diameter of 20 μm or less, in particular 10 μm or less, more in particular 5 μm or less.

The feed enters the vane type inlet device 70 via line 71, for preseparation of large liquid droplets from the gas stream and distribution of the gas stream in the vessel. In the present application it can be the case that the feed gas contains no or very little droplets large enough so that they could be separated by a vane type inlet device under typical high gas load conditions $\lambda \geq 0.10$. In this case, the inlet device mainly serves for gas distribution over the cross-section of the vessel.

The gas stream flows upwards in the vessel. The tray 63 and ring 60 are sealed so that the gas is forced to enter into the wash tray 3 from below. Suitably at least 25 wt %, in particular at least 50 wt % of the liquid hydrocarbon contaminants that enter the swirltube wash tray can have a diameter between 0.01 μm and 20 μm diameter, and in particular between 0.05 and 10 μm, more in particular between 0.1 and 5 μm.

Now a single swirl tube device 13 of the wash tray, such as the right-hand swirl tube as shown in FIGS. 1 and 2, will be considered. The gas is admitted to the swirl tube via inlet opening 19 and flows upwards along the liquid delivery device 22.

Wash liquid is admitted into the gas stream in the swirl tube via the inlet for wash liquid, liquid delivery device 22. Wash liquid is introduced via liquid delivery opening 26 into the swirl tube device 13 by the gas stream, and by the action of the gas flowing along the liquid delivery opening, such as by breaking off a liquid film from a sharp edge or rim, a gas/liquid mixture with wash liquid droplets dispersed in the gas stream is formed.

The wash liquid droplets and liquid contaminant droplets interact while flowing upwards with the gas stream in the scrubbing section 28. Suitably this process takes place over the entire cross-section of the tube 15, and for this reason it is beneficial that there is no substantial swirling motion in the scrubbing section, which could cause centrifugal separation.

Before discussing the further details of the process of the invention, the interaction of wash liquid droplets and liquid contaminant droplets will now be discussed. Without wishing to be bound to a particular theory, applicant believes that a relevant mechanism for the function of the present invention is inertial impaction between wash liquid droplets and contaminant droplets.

Due to their small size and mass the contaminant droplets will follow the gas. When the gas meets a wash liquid droplet, dispersed in the gas flow, and is diverted, the inertia of the contaminant droplets may be sufficient to pass the gas streamlines and hit the wash liquid droplet. In the paper "Venturi and other atomising scrubbers efficiency and pressure drop" by S. Calvert, AIChE Journal vol. 16 (1970), p 392-396 is disclosed a method to calculate the efficiency of atomising scrubbers based on a model for dust particle collection by inertial impaction.

The reduction $\Delta c_c$ of contaminant concentration $c_c$ in the gas along a distance $\Delta z$ in the scrubber can be determined from the equation $$\Delta c_c = \exp\left(-\frac{3|v_g - v_d|x_d}{2d_d v_g}\eta\Delta z\right), \tag{1}$$

wherein $v_g$ is the gas velocity, $v_d$ is the velocity of the wash liquid droplets, $x_d$ is the volume fraction of the wash liquid droplets in the gas/liquid mixture, $d_d$ is the diameter of the wash liquid droplets, and $\eta$ is a collection efficiency of a single drop. $\eta$ can be calculated from the empirical expression $$\eta = \left(\frac{K}{K+0.7}\right)^2, \tag{2}$$

where K is the inertial impaction parameter $$K = \frac{\rho_c d_c^2 |v_g - v_d|}{9\mu_g d_d}, \tag{3}$$

with $\rho_c$ and $d_c$ being the density and diameter of the contaminant droplets, and $\mu_g$ the gas viscosity.

In the swirltube wash tray a similar mechanism will occur. Here also a relatively small quantity of liquid is dispersed in a gas stream to sweep out contaminant particles, in this case small hydrocarbon and water droplets. A strong point of swirltube trays is that they can be operated with a high liquid to gas ratio. By means of internal liquid recirculation a wash liquid to gas ratio of the order 10 $l/m^3$ can be established, which is an order of magnitude larger than that in e.g. a venturi scrubber. Liquid recirculation will be discussed in more detail hereinbelow.

Efficiencies $E=\Delta c_c/c_c$ of liquid contaminant captured by the wash liquid, as calculated on the basis of equations (1)-(3) and for the typical operating conditions of swirltube trays, i.e. actual gas velocities of between 1 to 2 m/s, and a gas density of 50-100 $kg/m^3$, are shown in FIG. 5, as a function of the size of the collecting wash liquid droplets, and for various wash liquid-to-gas ratios L/G.

Droplet size distribution measurements have been carried out with an embodiment of the swirl tubes 13 and with means for dispersing liquid of FIG. 2, and an average droplet size (droplet volume average) of 350 μm was found. On the basis of this droplet size and the efficiency predictions in FIG. 5, for a wash liquid-to-gas ratio of 10 $l/m^3$ a contaminant droplet removal efficiency of 95% is expected. This estimate is probably on the conservative side, because accounting for the actual droplet size distribution is expected to lead to higher efficiencies.

Suitably, for a given contaminant droplet size or size distribution, the volume-averaged droplet size of wash liquid droplets and the wash liquid/gas ratio is chosen such that at least 90 wt %, preferably at least 95 wt %, of the contaminant droplets are captured by the wash liquid, which can be verified by calculations analogous to the ones discussed in connection with FIG. 5. The volume-averaged collecting droplet size can for example be 1000 μm or below, 600 μm or below, 400 μm or below.

Now we return to the discussion of normal operation of the vessel 1. At the downstream end of the scrubbing section 28 the gas stream contains coagulated larger liquid drops formed from wash liquid and liquid contaminant droplets.

This gas stream is passed through or along swirl imparting means 30. Suitable swirl imparting means are known in the art and typically comprises one or more inclined vanes or blades.

The gas/liquid mixture is set into a swirling motion, and liquid is flung outwardly towards the inner wall of the tube 15. A liquid-rich stream or film flowing upwardly along the inner wall is formed. The separated liquid passing over the upper rim of the tube 15 (and/or through openings in the tube wall) is directed by guide means 31 (including, if applicable, the beaker-shaped gas outlet 34) onto the upper horizontal plate 6. A liquid-depleted gas stream passes upwardly.

Liquid is collected on the upper horizontal plate. There it is mixed with wash liquid received from the liquid supply means 50 via outlet openings 53. Liquid from the upper tray 6 enters into the liquid supply space 8 via inlet openings 56. The maximum liquid height on the upper plate 6 is determined by the inlet 37 of the downcomer 35, this is the height of the liquid collection space 38 during normal operation.

The wash liquid is thus recirculated within the wash tray. Suitably, the wash tray is designed such that the liquid undergoes between 2 and 50 recirculations on the tray, preferably between 5 and 20 recirculations. For example, when the number of recirculations is 10, a net wash liquid supply of say 5 $m^3$/hr to the tray is equivalent to a wash liquid throughput of 50 $m^3$/hr on the wash tray. Recirculation can be set by the hydraulic design of the tray. The liquid not recirculated is passed to the bottom of the vessel 1 via the downcomers 35, which suitably combine to a single downcomer conduit extending to the bottom of the vessel.

Gas leaving the swirl tubes upwardly through the central gas outlet openings 33 typically still contains liquid. The swirl-tube devices 13 as shown are not designed for maximum liquid removal, but fulfil the combined function of scrubbing and separation. A suitable separation efficiency is 90% or higher, preferably 95% or higher. The liquid still remaining in the gas is a combination of wash liquid and liquid contaminant, and has a much larger droplet size than the contaminant liquid droplets in the feed gas, typically of 20 μm diameter or more. For maximum liquid removal the gas is further guided upwardly within the ring 60 to a dedicated secondary gas/liquid separator, separation swirldeck 62.

Alternatively a secondary separator could in principle also be a vane pack or a wiremesh, but a separation swirldeck is preferred because it can operate with high efficiency and capacity even at relatively high pressures.

The larger droplets in the gas can be removed with high efficiency, such as 98% efficiency or better, by the separation swirldeck. Cleaned gas leaves the separation swirldeck and the vessel 1 via outlet 80. Liquid separated by the separation swirldeck is sent to the bottom of the vessel 1.

At the bottom, gravity separation between water and liquid hydrocarbons takes place. The double weir system 90,91 at the bottom of the vessel 1 enables separate removal of water and hydrocarbons. The water flows via an underflow weir 90 and an overflow weir 91 into the cylindrical water compartment 92 centrally placed in the vessel, to water outlet 95. The hydrocarbons flow via an overflow weir into the annular hydrocarbon compartment 98 placed along the outer wall. From there they are removed via hydrocarbon outlet 99. The height of the overflow weir 91 and the overflow weir of the annular hydrocarbon compartment 98, in combination with the densities of water and hydrocarbons, determines the position of the interface level and the Normal Liquid level (NLL) in the inlet compartment.

The collector tray 85 underneath the gas inlet assembly 70 supports the optimum liquid/liquid separation at the vessel bottom. The embodiment shown comprises a number of inclined plates guiding the liquid separated by the gas inlet assembly via downcomers into the liquid sump. As further benefits, the collector tray suppresses liquid-re-entrainment, and also gas-carry-under that could disturb liquid-liquid separation.

The embodiment of tray 3 as shown in FIG. 1 has upper and lower plates 6 and 7. Between the plates the liquid supply space 8 is formed. On top of plate 6 the liquid collection space 38 is formed, and liquid flows from the liquid collection space via openings 56 to the liquid supply space. This arrangement wherein liquid collection space and liquid supply space are separate can be particularly beneficial if in a special embodiment several wash trays are stacked on top of each other. The downcomer 35 of a higher tray can then open into the liquid supply space of a lower tray. In this way a staging effect between several trays can be achieved. In many if not most cases, however, a single wash tray will be sufficient. In this case, and also for the highest tray in a stack of trays, it is not generally needed to arrange an upper tray plate 6 above the (lower) tray plate 7. In this case the liquid collection space 38 and liquid supply space 8 coincide.

Example

For the purpose of illustration of normal operation we will now discuss an example of the liquid content of the gas stream at various positions in the vessel 1. In this example the gas stream entering via line 71 contains 200 l/hr of liquid hydrocarbon contaminants in finely dispersed form, which are not substantially separated from the gas stream in the vane type inlet device 70. The water header supplies wash water at a rate of 5000 l/hr to the wash tray 3. Due to the internal recirculation of liquid in the wash tray which in this example is designed to be 10 times, the effective throughput of wash liquid is 50000 l/hr. At a capture efficiency of 95%, 190 l/hr contaminant liquid is captured by the wash liquid. The remaining 10 l/hr contaminants are not captured and flow upwardly with the gas to the separation swirldeck, where they are not substantially removed due to their small size and leave the column with the gas. The centrifugal separation by the swirl tube devices of the wash tray, at an assumed efficiency of about 95%, results in 2510 l/hr liquid, consisting of 2500 l/hr wash water+10 l/hr contaminants, flowing upwardly to the separation swirldeck. 2680 l/hr (i.e. the remaining net 2500 l/hr wash water and 180 l/hr liquid hydrocarbon contaminants) are directed to the liquid sump. The separation swirldeck operates for example at a liquid removal efficiency of about 98%, therefore 50-51 l/hr liquid (most of which is wash liquid) leave the vessel via gas outlet 80, and the remaining liquid is also sent to the sump for water/hydrocarbon separation. In addition to liquid hydrocarbon contaminants, also aqueous contaminant droplets can be present, which are similarly captured, but dissolved in the wash water. A bleed stream 96 of e.g. 390 l/hr is removed from the water recirculation, and a suitable make-up stream of fresh wash water is added via line 97 to maintain the wash water liquid level in the sump. After water/hydrocarbon separation in the lower part of the vessel, 190 l/hr of liquid hydrocarbons are isolated and removed from the hydrocarbon skimmer.

That which is claimed is:

1. A method of removing liquid hydrocarbon contaminant droplets from a natural gas stream, which method comprises
providing a wash tray in a vessel, which wash tray comprises at least one swirl tube device, said swirl tube device having an inlet for gas, an inlet for a wash liquid, a scrubbing section, a swirl imparting section downstream from the scrubbing section, an outlet for washed gas, and an outlet for liquid;
admitting the natural gas stream including liquid hydrocarbon contaminant droplets into the swirl tube device via the inlet for gas;
admitting a wash liquid consisting of water into the natural gas stream in the swirl tube device via the inlet for wash liquid, to form a gas/liquid mixture with wash liquid droplets dispersed in the natural gas stream;
allowing the wash liquid droplets and liquid hydrocarbon contaminant droplets to interact in the scrubbing section;
passing the gas/liquid mixture through the swirl imparting section so as to perform centrifugal separation of the gas/liquid mixture into washed natural gas and liquid, and removing washed natural gas and liquid from the outlet for washed gas and the outlet for liquid.

2. The method according to claim 1, wherein a wash liquid supply space is arranged on the wash tray, in fluid communication with the inlet for liquid of the swirl tube device, and wherein at least part of the liquid from the outlet for liquid is returned to the wash liquid supply space.

3. The method according to claim 1, wherein the wash tray comprises a tray plate, on which during normal operation wash liquid is present, and wherein the wash liquid is admitted to the wash tray using a liquid supply conduit having an outlet for wash liquid above the tray plate.

4. The method according to claim 1, wherein the liquid hydrocarbon contaminant droplets have a diameter of 20 μm or less.

5. The method according to claim 1, wherein the wash tray is arranged in the vessel upstream of a secondary gas/liquid separator.

6. The method according to claim 1, wherein the washed gas is subsequently passed to a gas treating unit.

7. The method according to claim 1, wherein the wash liquid is introduced into an upstream part of the swirl tube device.

8. The method according to claim 6, wherein the gas treating unit is an amine treating unit.

9. The method according to claim 4, wherein the liquid hydrocarbon contaminant droplets have a diameter of 10 μm or less.

10. The method according to claim 1, wherein the liquid hydrocarbon contaminant droplets have a diameter of 5 μm or less.

11. The method according to claim 1, wherein the wash liquid to gas ratio is between 5 $l/m^3$ and 15 $l/m^3$.

12. A method for reducing the foaming tendency of a natural gas stream containing liquid hydrocarbon contaminant droplets, which natural gas stream is to be subjected to an amine treatment to remove acid gas compounds, said method comprising:

providing a wash tray in a vessel, which wash tray comprises at least one swirl tube device, said swirl tube device having an inlet for gas, an inlet for a wash liquid, a scrubbing section, a swirl imparting section downstream from the scrubbing section, an outlet for washed gas, and an outlet for liquid;

admitting the natural gas stream containing liquid hydrocarbon contaminant droplets into the swirl tube device via the inlet for gas;

admitting a wash liquid consisting of water into the gas stream in the swirl tube device via the inlet for wash liquid, to form a gas/liquid mixture with wash liquid droplets dispersed in the natural gas stream;

allowing the wash liquid droplets and liquid hydrocarbon contaminant droplets to interact in the scrubbing section;

passing the gas/liquid mixture through the swirl imparting section so as to perform centrifugal separation of the gas/liquid mixture into washed natural gas stream and liquid, and removing the washed natural gas stream having a reduced foaming tendency from the outlet for gas.

13. The method according to claim 12, wherein the wash liquid to gas ratio is between 5 $l/m^3$ and 15 $l/m^3$.

* * * * *